(No Model.)
N. S. GOFF.
BICYCLE ATTACHMENT.
No. 535,331. Patented Mar. 5, 1895.
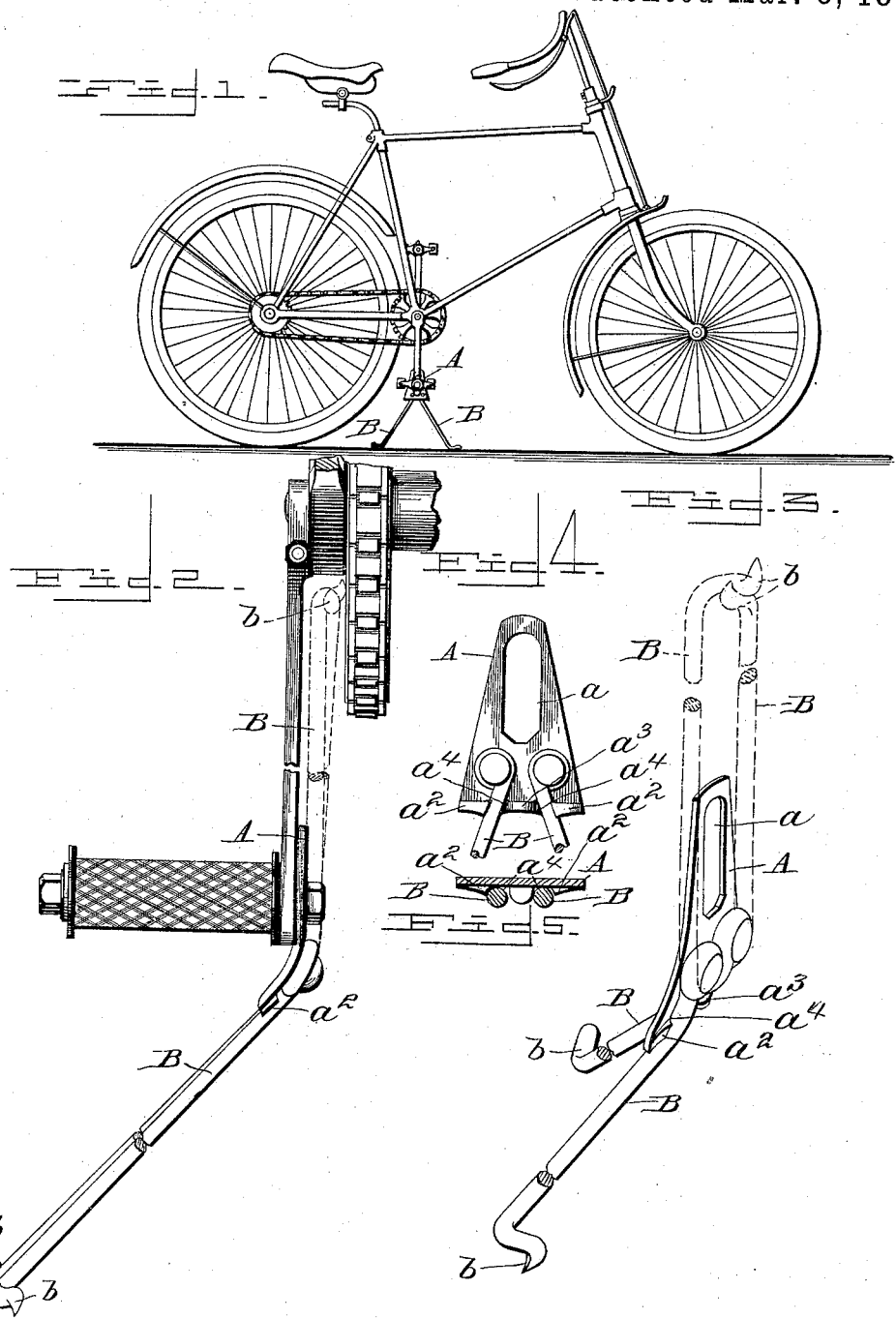
Witnesses
N. H. Pumphrey
C. E. Pine
Inventor,
Nathaniel S. Goff
by Geo. H. Holgate
his Attorney.
THE NORRIS PETERS CO., PHOTO-LITHO., WASHINGTON, D. C.

ly, in details of construction.
UNITED STATES PATENT OFFICE.

NATHANIEL S. GOFF, OF CAMDEN, NEW JERSEY.

BICYCLE ATTACHMENT.

SPECIFICATION forming part of Letters Patent No. 535,331, dated March 5, 1895.

Application filed June 28, 1894. Serial No. 515,921. (No model.)

*To all whom it may concern:*

Be it known that I, NATHANIEL S. GOFF, a citizen of the United States, residing at Camden, in the county of Camden and State of New Jersey, have invented certain new and useful Improvements in Bicycle Attachments, of which the following is a specification.

The invention relates to bicycle attachments.

The object is to produce a device, adapted to be removably attached and carried upon a bicycle, and capable of ready adjustment, to serve as a support, in retaining the machine in an upright position; and further, to employ a construction, in a supporting attachment, which will be at once simple, light and compact.

With these objects in view, the invention consists in an attaching head adapted to be removably secured upon the pedal of a bicycle, legs pivoted to the head, and means for yieldingly retaining the legs, to serve as a support; furthermore, in a removably secured head, adjustable upon the pedal of a bicycle, legs pivoted to the head, and having their free ends bent up, into engaging projections, whereby they are connected and held, when not in use, and means for yieldingly retaining the legs, to serve as a support; and finally, in details of construction.

The invention is illustrated in the accompanying drawings, forming part of this specification, and in which like letters of reference indicate corresponding parts in the several views.

Figure 1, is a view in elevation, of one embodiment of the invention, applied, and in operative position as a support for a bicycle, showing the attaching head secured to the pedal, the legs pivoted to the head and spread, to serve as a support, and the bent up extremities of the legs, acting as feet, to insure against rocking or wabbling of the support. Fig. 2, is a detail view, in elevation, on an enlarged scale, showing the attaching head removably secured upon the spindle of the pedal, by a nut, the legs pivoted to the head and indicated, by full lines, in operative position as a support, being inclined downward and outward from the machine and retained by projections, upon the head, and by dotted lines, their position, when out of use, or turned upward, behind the pedal crank, with their free ends connected. Fig. 3, is a detail view in perspective, of the device attached, showing the legs in operative position as a support, and by dotted lines, their position when out of use, the upper ends thereof, being held connected by the respective engaging hooks thereof. Fig. 4, is a detail view, in elevation, of the attaching head, showing the legs pivoted thereto, and the projections, between which the legs are retained in operative position. Fig. 5, is a sectional view, taken transversely of the head, above the projections thereof, and more clearly illustrating the form of the projections and the manner in which the legs are held.

In the drawings: $a$, represents an attaching head, slotted at A, to receive the threaded spindle of the pedal of a bicycle, which projects through the slot; the head being secured thereon, in the rear of the crank, by a nut, and provided at the lower edge or base with projections $a^2$, $a^3$. The projections $a^2$, at or adjacent the sides of the head, increase in thickness toward the center thereof, to form gradual inclines, the projection $a^3$, being centrally disposed between the projections $a^2$, in a manner, to form at its sides, notches $a^4$.

B, represents duplicate legs preferably of spring metal, which are pivoted to the head, above the inclined projections, the legs being free to move about their pivotal centers, and having their free ends, bent up, into engaging hooks $b$, $b$, by which, when not in use, they may be connected at the ends, as indicated by dotted lines in Figs. 2, and 3, of the drawings.

In use, the movement of the legs is limited, by the ends being connected, whereby they are held, projecting above the pedal, in the rear of the crank thereof, in a manner, to avoid interference with the moving parts of the machine and be at all times clear of the ground. When it is desired to retain the machine in an upright position, the legs are adjusted, by being disconnected at their ends and turned in opposite directions, about their pivotal center, and being of spring metal, yield, as they are forced over the inclined projections of the head and drop into the notches, at the sides of the central projection, which latter, serves as a spacing stop, to retain the legs spread. By reason of the curvature of the head, the axis about which the legs turn, is at an angle, which varies with the nature of the curve, causing the legs to be more or less inclined downward and outward from the machine, in which position, they serve as an efficient, firm and reliable support, to retain the machine upright, against rocking, as when accidentally jarred, or upon collision with moving vehicles, trucks, and so on.

Among the important advantages may be mentioned the extreme simplicity of construction and the absence of small or frail parts, by which the cost of manufacture is reduced to a minimum, and the device rendered strong and durable; also effectiveness in operation, compactness, when out of use, and rapidity and convenience of adjustment.

Having described the invention, what I claim as new, and desire to secure by Letters Patent, is—

1. A support for bicycles, comprising an attaching head, legs pivoted to the head and having their outer free ends bent up, into engaging hooks, by which they are connected when not in use, as specified.

2. A support for bicycles, comprising a removably secured head, legs pivoted to the head and having their outer free ends bent up, into engaging hooks, by which they are connected when not in use, and means for retaining the legs, to serve as a support, as specified.

3. A support for bicycles, comprising a slotted head adapted to be adjustably secured upon the spindle of a pedal, and provided at its base, adjacent the sides, with oppositely inclined projections, and a stop, centrally disposed between the projections, legs pivoted to the head and adapted to be forced over the inclined portions thereof, into notches formed between the projections and the stop, as specified.

In witness whereof I have affixed my signature in the presence of two subscribing witnesses.

NATHANIEL S. GOFF.

Witnesses:
GEORGE MCCURDY,
P. E. PEIRCE.